United States Patent [19]

Iacchetta et al.

[11] Patent Number: 5,226,856
[45] Date of Patent: Jul. 13, 1993

[54] ROLLER CHAIN CONSTRUCTED WITH NYLON ROLLERS

[75] Inventors: Nicholas A. Iacchetta, Rochester; Timothy J. Ledvina, Groton, both of N.Y.

[73] Assignee: Borg-Warner Automotive Transmission & Engine Components Corporation, Sterling Heights, Mich.

[21] Appl. No.: 914,769

[22] Filed: Jul. 15, 1992

[51] Int. Cl.$^5$ ............................................. F16G 13/06
[52] U.S. Cl. ................................................... 474/207
[58] Field of Search ................ 474/206, 207, 209, 212, 474/214, 215

[56] References Cited

U.S. PATENT DOCUMENTS

| | | |
|---|---|---|
| 2,223,314 | 11/1940 | Cumfer . |
| 3,377,875 | 4/1968 | Ledvina et al. . |
| 3,495,468 | 2/1970 | Ledvina et al. . |
| 4,094,515 | 6/1978 | Araya et al. .................. 474/207 X |
| 4,123,947 | 11/1978 | Smith et al. ..................... 474/207 |
| 4,186,617 | 2/1980 | Avramidis et al. . |
| 4,342,560 | 8/1982 | Ledvina et al. . |
| 4,344,761 | 8/1982 | Steuer . |
| 4,650,445 | 3/1987 | Mott . |

*Primary Examiner*—Thuy M. Bui
*Attorney, Agent, or Firm*—Willian Brinks Olds

[57] ABSTRACT

A roller chain is provided with links having some rollers of nylon. The nylon rollers may be arranged with standard metallic rollers in patterns along the length of a single-strand or double strand roller chain. The nylon is polytetramethylene-adipamide.

8 Claims, 2 Drawing Sheets

ROLLER CHAIN CONSTRUCTED WITH NYLON ROLLERS

BACKGROUND OF THE INVENTION

1. Field of the Invention

The present invention relates generally to power transmission chains. The invention has particular application to power transmission chains of the roller chain variety, which are used in engine timing applications as well as in industrial applications.

2. Description of the Prior Art

Power transmission chains are widely used in the automotive industry. Such chains are used for engine timing drives as well as for the transfer of power from the engine to the transmission or for the transfer of power in a transfer case. Power transmission chains are also widely used in industrial applications.

One type of chain is know as "roller chain". A typical roller chain consists of alternate inner links and outer links. The inner links, which are also known as "bushing" links, consist of spaced link plates, or sidebars, with bushings tightly received in openings, or apertures, at each end of the sidebars. The outer links, which are also known as "pin" links, consist of spaced link plates, or sidebars, with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. An example of roller chain is found in U.S. Pat. No. 4,186,617, which is incorporated herein by reference.

Roller chain drives can include both "true roller" and rollerless design. The true roller design includes the described rollers mounted about the bushings. Rollerless chain contains bushings that directly contact the sprocket. Both types of roller chain are typically specified in industry as British Standard chain and American National Standards Institute (ANSI) chain.

A conventional roller chain drive is comprised of a roller chain wrapped about at least two sprockets supported by shafts. The chain is endless and assembled from interconnected links that are adapted to fit over and about teeth formed on the sprockets. Movement of a driving sprocket causes power transmission through the chain and consequent movement of a driven sprocket. In an engine timing drive application, the driving sprocket may be mounted on the engine crankshaft and the driven sprocket mounted on a valve camshaft. The rotation of the camshaft is thus controlled by the rotation of the crankshaft through the roller chain. Timing drive applications can include the use of a power transmission chain to drive a plurality of sprockets or in the camshaft to camshaft drive in an overhead camshaft engine.

Noise is associated with chain drives. Noise is generated by a variety of sources, but in roller chain drives it can be caused by the impact sound generated by the collision of the chain and the sprocket at the onset of meshing. The loudness of the impact sound is affected by, among other things, the impact velocity of between the chain and the sprocket and the impact of the steel rollers or bushings against the steel or powdered metal sprockets.

The meshing impact sound is generally a periodic sound in chain drives. The impact sound is repeated with a frequency approximately equal to that of the frequency of the chain meshing with the sprocket. The frequency can be related to the number of teeth on the sprocket and the speed of the sprocket.

Many efforts have been made to decrease the noise level and pitch frequency distribution in chain drives of both the silent chain and the roller chain variety. The problem of noise reduction in silent chain drives was addressed in U.S. Pat. No. 4,342,560 by changing the contacts between the link flanks of a silent chain and the sprockets by having differently configured link flanks in different sets of the chain. By mixing of links of differing flank configuration, U.S. Pat. No. 4,342,560 attempted to modify the pattern of sound emanating from the chain contacting the sprocket by altering the types of link configurations and thus altering the point and rhythm of contacts. In U.S. application Ser. No. 07/776,994, filed Oct. 16, 1991, which is incorporated herein by reference, some of these concepts were utilized in a roller chain by variation of rollers configuration and the chain pitch length.

Other attempts to alter the rhythm of contacts between the chain drive and the sprocket taught the modification of the sprocket teeth. For example, U.S. Pat. No. 3,377,875 and U.S. Pat. No. 3,495,468, teach relief of sprocket teeth in order to achieve noise reduction in contacts between the silent chain and the sprocket.

In the area of side-bar chains for cone pulley transmissions, U.S. Pat. No. 4,344,761 describes a side-bar chain construction which is designed to prevent sympathetic vibrations between the chain and the cone pulleys. The patent teaches causing the lengths of selected links between associated articulation points to differ from those of the remaining links. U.S. Pat. No. 4,650,445 discusses various other methods of construction of silent chains and chain-belts for variable pulley transmissions that are attempts to modify the generated noise pattern.

The present invention utilizes these generic concepts of noise reduction in a roller chain. The present invention also includes rollers of a different material in the chain for purposes of noise reduction. The present invention seeks to provide a roller chain construction that modifies the impact of the chain and the sprocket by the inclusion of a nylon roller in the construction. The present invention also seeks to provide a roller chain construction that modifies the pattern of chain and sprocket contacts through the use of nylon rollers in varying locations throughout the chain.

SUMMARY OF THE INVENTION

In accordance with one embodiment of this invention, a roller chain is provided with links including rollers constructed of non-metallic material, such as nylon. The present invention presents a new use for a commercially available chemical product. The present invention also involves the combination of nylon rollers with standard metallic rollers in various patterns in a roller chain to achieve a lower noise chain and sprocket assembly.

In the preferred embodiment, the nylon rollers are manufactured with polytetramethylene-adipamide, or 46 nylon, manufactured and commercially available as Stanyl 46 nylon from DSM Engineering Plastics of Reading, Pa. Alternatively, the nylon rollers may be formed with a reinforcing material such as fiberglass or aramid fibers.

In one embodiment, a roller chain is provided for use with a pair or series of sprockets. The chain is comprised of a series of interleaved inner links and outer links. Each outer link has a pair of outer link plates fixedly mounted to spaced pin members. Each inner link has a pair of bushings mounted to turn on the pins of the outer links. The inner links each have inner link plates fixedly mounted to the bushings. Each bushing is adapted to contact the teeth of the sprocket. Each of the inner links and outer links is adapted to receive a sprocket tooth between them. Rollers may be provided for rotation on the bushings and to provide contact surfaces for the sprocket teeth.

The chain includes nylon rollers in the links to reduce the impact sound from the roller contacting the sprocket. The nylon rollers are preferably interspaced with the standard steel rollers in the roller chain links. The nylon rollers may be included in a prescribed alternating, repeating or random pattern within the chain assembly. The nylon roller may be of a size slightly larger or slightly smaller than the standard steel rollers. The chain may be either single strand or double strand.

Use of a roller chain constructed in accordance with the teachings of this invention with a sprocket is expected to result in the generation of a noise pattern that is modified in comparison with the noise pattern generated by a chain and sprocket in which all the rollers are of identical material, that is, conventional steel rollers. The differing materials located throughout the chain modify the pattern of contacts between the roller chain and the sprocket. The chain of this invention is suitable for use with a variety of sprocket tooth forms, including sprockets with dual teeth. Also, the nylon material may also be used in the bushings of a chain which has no rollers and the bushings directly contact the sprocket.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale.

DESCRIPTION OF THE DRAWINGS DETAILED

Figure 1:
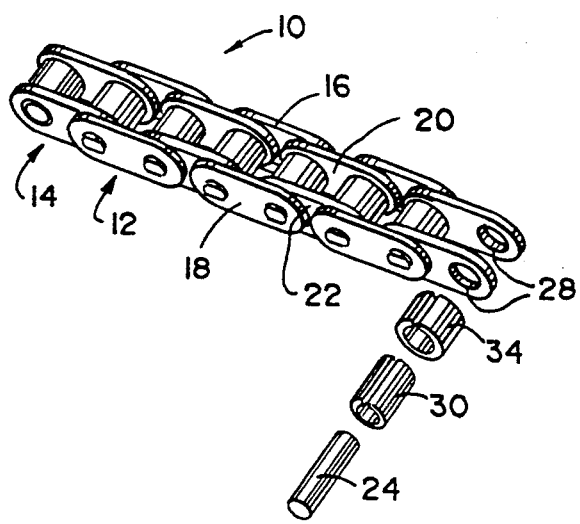
FIG. 1 is a perspective view of a roller chain having the present invention, shown partly in exploded
Figure 3:
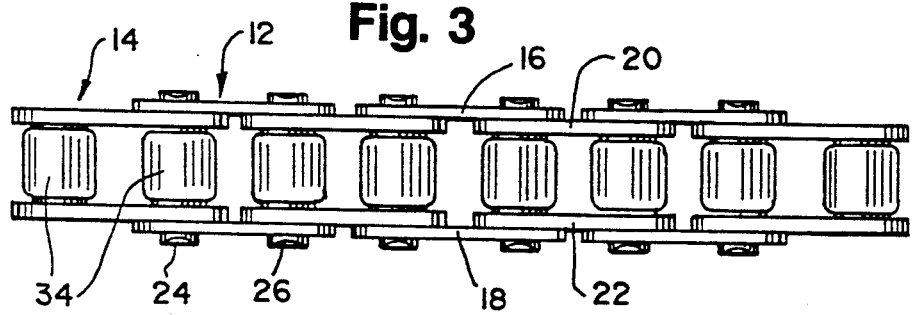
FIG. 3 is a plan view of a roller chain having the present invention.
Figure 4:
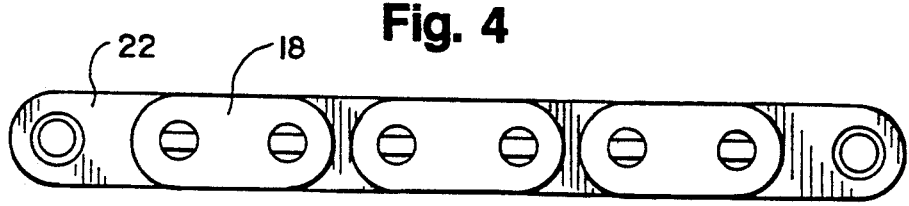
FIG. 4 is a side view of the chain of FIG. 3.

Turning now to the drawings, FIGS. 1 illustrates a portion of the chain of the present invention generally at 10. The chain is constructed by a series of links, pins, bushings and rollers. The chain includes a series of interleaved outer links 12 and inner links 14, which are shown more clearly in FIG. 3. The outer links are formed by a pair of outer link plates 16, 18, or sidebars. The inner links are likewise formed by a pair of inner link plates 20, 22, or sidebars.

The outer link plates 16, 18 are fixed to a pair of pins 24, 26. The pins are spaced apart and fitted through apertures 28 in the outer link plates. The pins are secured in the outer link plates by a press fit, or welding, caulking or any other means known in the art. The distance between the pins of a conventional roller chain is the pitch of the chain.

The innerlink plates 20, 22 are fixed to a pair of bushings 30, 32. The bushings are generally cylindrical in shape and spaced apart and fitted through apertures 28 in the inner link plates. The bushings are secured in the inner link plates by a press fit, or by welding, caulking or any other means known in the art.

The bushings are mounted about the pins and are freely rotatable about the pins. Thus, rotation of the bushings about the pins allows pivoting of the outer links with respect to the inner links. In the chain shown in FIG. 1, rollers 34 are mounted about the bushings and are freely rotatable about the bushings. The rollers are generally cylindrical in shape.

Figure 2:
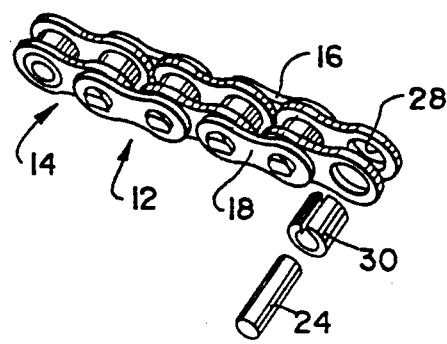
FIG. 2 is a perspective view of a roller chain having the present invention, shown partly in exploded view.

Thus, the chain of FIG. 1 is constructed by inserting the pin within the bushing and the bushing within the roller. The bushings and roller are generally formed with a split, as shown in FIGS. 1 and 2. The bushings are then secured to a pair of inner link plates and the pins are then secured to a pair of outer link plates. The inner links and outer links are alternated in series to form an endless chain. The length of the chain and exact number of inner and outer links is determined by, among other things, the application and ratio and center distance between the sprockets.

The rollers of the chain contact the teeth of the sprocket (not shown). The rollers seat in the root between the sprocket teeth. The outer links and inner links are constructed so that the teeth of the sprocket can be received between the link plates and between the rollers.

In one embodiment, some of the rollers are constructed of nylon. In the preferred embodiment, the rollers are manufactured with standard polytetramethylene-adipamide, or 46 nylon, manufactured and commercially available as Stanyl 46 nylon from DSM Engineering Plastics of Reading, Pa. The Stanyl 46 product literature describes Stanyl 46 nylon, in comparison with other nylons, as including an increased number of amide groups per given chain. The symmetrical structure of the nylon leads to a highly crystalline material and a high melting point. The Stanyl 46 nylon is preferred as a material on account of its high heat resistance, high stiffness at elevated temperatures, low creep at elevated temperatures, good toughness, good fatigue behavior and excellent resistance to chemicals. Other types of nylon may also be suitable, including reinforcing materials such as fiberglass or aramid fibers.

The chain drive system typically includes a driving sprocket and a driven sprocket (not shown) and the endless chain interconnecting the sprockets. In an engine timing drive, the system can include an idler sprocket or dual driving sprockets. Movement of the driving sprocket transfers power, or causes movement of the driven sprocket, through movement of the chain.

The present invention involves the use of differing materials for construction of rollers in a roller chain. In this regard, the present invention presents a new use for a commercially available chemical compound. The present invention also is directed to the combination of nylon and standard metallic rollers in a roller chain in an effort to provide a lower noise chain. The randomization of metallic and non-metallic rollers in a chain is a novel use of a generic noise reduction concept.

Figure 5:
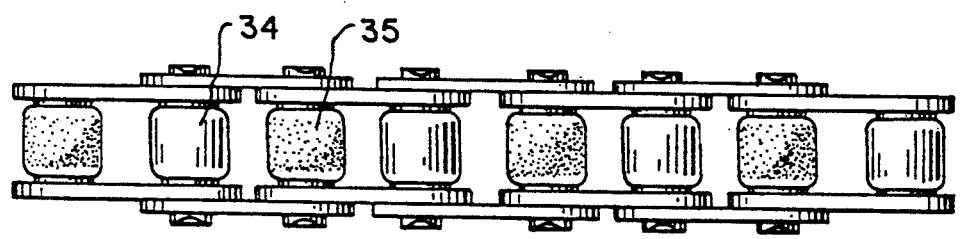
FIG. 5 is a plan view of the chain of the present invention in which the nylon rollers are alternated with metallic rollers.
Figure 6:
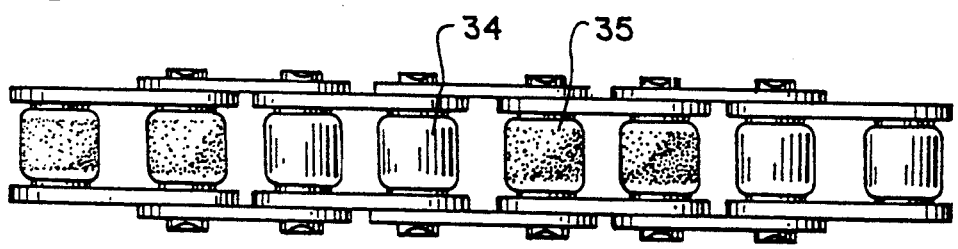
FIG. 6 is a plan view of the chain of the present invention in which the nylon rollers are placed in a prescribed repeating pattern with metallic rollers.
Figure 7:
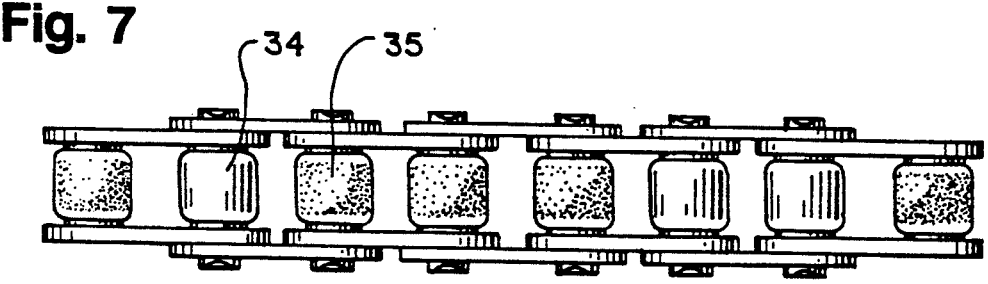
FIG. 7 is a plan view of the chain of the present invention in which the nylon rollers are placed in a prescribed random pattern with metallic rollers.

U.S. Ser. No. 07/776,994, filed Oct. 16, 1991, which is incorporated herein by reference, presents randomization concepts in a roller chain involving variation of the configurations of the rollers and pitch lengths. In the present invention, the metallic and non-metallic rollers are intermixed in order to alter the roller to sprocket contacts and reduce the impact noise spectrum of the chain. The non-metallic rollers may be placed within only certain links or, as shown in FIG. 5, may be alternated link-by-link along the length of the chain. In FIG. 5, the standard rollers are designated 34 while the non-metallic rollers are designated 35. Alternately, the nylon rollers may be placed randomly throughout the chain or in a prescribed random pattern in an effort to modify the noise spectrum. In FIG. 6, the nylon rollers 35 are varied in a repeating pattern with the metallic rollers 34. In FIG. 7, the nylon rollers 35 are varied in a prescribed random pattern with the metallic rollers 34. The variation in rollers which has been described can also be applied to the bushings in the rollerless chain shown in FIG. 2, where the bushings directly contact the sprocket teeth.

The present invention also has application to chains of multiple rows, including double row and triple row chain. The randomization techniques described above are utilized in conjunction with various links of the multiple row chain. The randomization techniques described above may also be utilized with a standard sprocket, having teeth equally spaced around the periphery of the sprocket, or with a modified sprocket, having unequally spaced teeth.

In operation, the chain of the present invention alters the contact of the chain with the sprocket. By variation of the materials utilized in construction of the rollers, through use of nylon, Stanyl 46 nylon, or various other materials available to those skilled in the art, the pattern of impacts of the links with the sprocket is modified. Modification of the chain in the described manner will result in an alteration of the pattern of contacts which should alter the noise spectrum for the chain.

Use of a roller chain constructed in accordance with the teachings of this invention with a sprocket is expected to result in the generation of a noise pattern that is modified in comparison with the noise pattern generated by a chain and sprocket in which all the rollers are of identical material. The differing materials modify the pattern of contacts between the roller chain and the sprocket. The chain of this invention is suitable for use with a variety of sprocket tooth forms, including sprockets with dual teeth.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A roller chain assembly for use with a sprocket, said chain assembly having a series of interleaved inner links and outer links;
   each outer link having a pair of outer link plates fixedly mounted to spaced pin members;
   each inner link having a pair of bushings being mounted to turn on said pins of said outer links, said inner links having inner link plates fixedly mounted to said bushings,
   rollers being mounted for rotation about said bushings of said inner links, said rollers being adapted to contact the teeth of a sprocket,
   at least some of said rollers being constructed of non-metallic material.

2. The roller chain assembly of claim 1 wherein said non-metallic material is polytetramethylene-adipamide nylon.

3. The roller chain assembly of claim 1 wherein said rollers constructed of non-metallic material are randomly arranged within the chain with rollers constructed of steel.

4. The roller chain assembly of claim 1 wherein said rollers constructed of non-metallic material are arranged in a prescribed pattern in the chain assembly with rollers constructed of steel.

5. The roller chain assembly of claim 1 wherein said chain assembly includes a double chain strand, some links of said chain including said non-metallic rollers.

6. The roller chain assembly of claim 1 wherein said non-metallic rollers are of a size slightly greater than the metallic rollers.

7. The roller chain assembly of claim 1 wherein said non-metallic rollers are of a size slightly smaller than the metallic rollers.

8. The roller chain assembly of claim 1 wherein said non-metallic material includes reinforcing fiberglass material.

* * * * *